US012750367B2

(12) United States Patent
Desikan et al.

(10) Patent No.: US 12,750,367 B2
(45) Date of Patent: Sep. 29, 2026

(54) INTEGRATION AND IMPLEMENTATION OF GLOBAL EDGE FUNCTIONALITIES

(71) Applicant: SONICWALL INC., Milpitas, CA (US)

(72) Inventors: Tarun Desikan, Burlingame, CA (US); Jayanth Gummaraju, Walnut Creek, CA (US); Yoshio Turner, San Francisco, CA (US); Jasmine S. Sanghvi, Sunnyvale, CA (US)

(73) Assignee: SONICWALL INC., Santa Clara, CA (US)

( * ) Notice: Subject to any disclaimer, the term of this patent is extended or adjusted under 35 U.S.C. 154(b) by 149 days.

(21) Appl. No.: 18/773,978

(22) Filed: Jul. 16, 2024

(65) Prior Publication Data

US 2026/0025380 A1 Jan. 22, 2026

(51) Int. Cl.
*H04L 9/40* (2022.01)

(52) U.S. Cl.
CPC .............. *H04L 63/10* (2013.01); *H04L 63/08* (2013.01)

(58) Field of Classification Search
CPC ..... H04L 63/10; H04L 63/08; H04L 63/0272; H04L 63/0281; H04L 63/029
See application file for complete search history.

(56) References Cited

U.S. PATENT DOCUMENTS

| | | | | |
|---|---|---|---|---|
| 8,793,782 | B1 | 7/2014 | Su | |
| 9,130,921 | B2 | 9/2015 | Boubez | |
| 9,350,705 | B2 | 5/2016 | Gluck | |
| 10,205,666 | B2 | 2/2019 | Mittal | |
| 10,397,278 | B2 | 8/2019 | Gummaraju | |
| 11,075,955 | B2 | 7/2021 | Gummaraju | |
| 11,134,058 | B1 * | 9/2021 | Sole | G06F 21/554 |
| 11,943,195 | B1 * | 3/2024 | Jain | H04L 63/0272 |
| 12,316,478 | B2 | 5/2025 | Jindal et al. | |
| 2007/0156911 | A1 * | 7/2007 | Menten | G06F 21/552 726/13 |

(Continued)

FOREIGN PATENT DOCUMENTS

| | | | | |
|---|---|---|---|---|
| CN | 114616798 A * | 6/2022 | | H04L 9/40 |
| WO | WO 2025/122949 | 6/2025 | | |

OTHER PUBLICATIONS

PCT/US20244/058995, WO, Rean Griffith, Assessing and Identifying Responses to Security Risks, Dec. 6, 2024.

(Continued)

*Primary Examiner* — Javier O Guzman
(74) *Attorney, Agent, or Firm* — Patent Capital Group

(57) ABSTRACT

This disclosure is related to methods and apparatus for securely routing and controlling access of various types of traffic for one or more end-user devices. Securely routing and controlling access of the various types of traffic includes securely routing private application traffic from a first end-user device to a private network, securely routing private network traffic from a second end-user device to a private network, and filtering and monitoring Internet traffic for a third end-user device from the Internet or a Software-as-a-Service (SaaS) application. Securely routing and controlling access of the various types of traffic includes using a Zero (Continued)

Trust Network Access (ZTNA) proxy to authenticate the end-user devices and a firewall connector coupled with a network firewall to establish a connector tunnel.

20 Claims, 14 Drawing Sheets

(56) References Cited

U.S. PATENT DOCUMENTS

| | | | | |
|---|---|---|---|---|
| 2007/0156977 | A1 | 7/2007 | Ritter et al. | |
| 2012/0017085 | A1 | 1/2012 | Carter | |
| 2016/0044040 | A1 | 2/2016 | Caffary | |
| 2017/0214683 | A1 | 7/2017 | Kroehling | |
| 2017/0244672 | A1* | 8/2017 | Shulman | H04L 61/5007 |
| 2018/0034858 | A1 | 2/2018 | Gummaraju | |
| 2018/0191697 | A1* | 7/2018 | Ghafourifar | H04L 63/10 |
| 2019/0173870 | A1 | 6/2019 | Sweet et al. | |
| 2019/0387025 | A1 | 12/2019 | Gummaraju | |
| 2020/0186438 | A1* | 6/2020 | Patel | H04L 41/5051 |
| 2020/0336484 | A1* | 10/2020 | Mahajan | H04L 63/0884 |
| 2021/0029119 | A1* | 1/2021 | Raman | H04W 12/37 |
| 2021/0136040 | A1 | 5/2021 | Mestery et al. | |
| 2021/0160247 | A1 | 5/2021 | Gaddam et al. | |
| 2021/0314301 | A1 | 10/2021 | Chanak et al. | |
| 2022/0393943 | A1 | 12/2022 | Pangeni et al. | |
| 2023/0188527 | A1 | 6/2023 | O'Neill et al. | |
| 2023/0247003 | A1* | 8/2023 | Chanak | H04L 63/0272 726/1 |
| 2023/0254284 | A1 | 8/2023 | McCord | |
| 2023/0308453 | A1 | 9/2023 | Lefèvre et al. | |
| 2023/0388275 | A1* | 11/2023 | Mitin | H04L 63/029 |
| 2024/0022555 | A1 | 1/2024 | Koikara et al. | |
| 2024/0064138 | A1* | 2/2024 | Jain | H04L 63/0815 |
| 2024/0064147 | A1* | 2/2024 | Jain | H04L 63/08 |
| 2024/0146536 | A1* | 5/2024 | Das | H04L 9/3213 |
| 2025/0047605 | A1* | 2/2025 | Elul | H04L 63/0281 |
| 2025/0190587 | A1 | 6/2025 | Griffith et al. | |

OTHER PUBLICATIONS

U.S. Appl. No. 18/972,462, Rean Griffith, Assessing and Identifying Responses to Security Risks, filed Dec. 6, 2024.

PCT International Search Report and Written Opinion dated Jan. 24, 2025.

Donenfeld. WireGuard: Next Generation Kernel Network Tunnel. NDSS Symposium, Feb. 2017. [retrieved on Sep. 6, 2025]. Retrieved from the Internet https://www.ndss-symposium.org/wp-content/uploads/2017/09ndss2017_04A-3_Donenfeld_paper.pdf.

Internet Systems Consortium. BIND 9 Administrator Reference Manual. BIND 9.10.6-P1, Jan. 2018. [retrieved on Sep. 6, 2025]. Retrieved from the Internet https://downloads.isc.org/isc/bind9/9.10.6-P1/doc/arm/Bv9ARM.pdf.

Russell. Linux 2.4 NAT HOWTO. Revision 1.18, Jan. 2002. [retrieved on Sep. 6, 2025]. Retrieved from the Internet https://tim.kehres.com/docs/NAT-HOWTO.pdf.

Srisuresh et al. traditional IP Network Address Translator (Traditional NAT). RFC 3022, Jan. 2021. [retrieved on Sep. 6, 2025]. Retrieved from the Internet https://www.rfc-editor.org/rfc/pdfrfc/rfc3022.txt.pdf.

WIPO International Search Report with Written Opinion of the ISA mailed in Application No. PCT/US2025/037972 dated Sep. 17, 2025, 15 pages.

WIPO International Search Report with Written Opinion of the ISA mailed in Application No. PCT/US2025/037975 dated Sep. 25, 2025, 11 pages.

WIPO International Search Report with Written Opinion of the ISA mailed in Application No.dated Sep. 22, 2025, 12 pages.

USPTO, Non-Final Office Action mailed in U.S. Appl. No. 18/773,965 dated Oct. 2, 2025, 16 pages.

* cited by examiner

INTEGRATION AND IMPLEMENTATION OF GLOBAL EDGE FUNCTIONALITIES

BACKGROUND OF THE INVENTION

1. Field of Invention

The present invention generally relates to establishing secure communication between firewalls and the cloud. More specifically, the present invention relates to extending firewalls using automated connector activation, managing service tunnels, and offloading scaling functions to provide a flexible architecture that sets dynamic route provisions.

2. Description of the Related Art

The modern digital landscape has given rise to unprecedented demands on network security. As organizations increasingly rely on cloud-based services and remote access to stay competitive, the need for robust and scalable security solutions has never been more pressing. One of the most significant challenges facing IT professionals today is the management of hybrid networks, where on-premises infrastructure may require seamlessly integrate with cloud-based resources. This convergence of network architectures creates a complex web of connectivity and security requirements that can be difficult to navigate.

Legacy Virtual Private Networks (VPNs) and firewalls reveal significant performance, manageability, and security limitations when trying to provide simple, safe, and secure access to the applications and resources users need across hybrid, multi-cloud, and SaaS environments. And, users are left open to attack accessing internet-based information and applications.

SUMMARY OF THE CLAIMED INVENTION

The presently claimed invention relates to a method, a non-transitory computer-readable storage medium, or an apparatus executing functions consistent with the present disclosure for securely routing and controlling access of various types of traffic for one or more end-user devices. A method consistent with the present disclosure may include securely routing private application traffic from a first end-user device to a private network, securely routing private network traffic from a second end-user device to the private network, and filtering and monitoring Internet traffic for a third end-user device from the Internet or a Software-as-a-Service (SaaS) application. The securely routing private application traffic may include receiving a request by the first end-user device for verification by a Zero Trust Network Access (ZTNA) proxy, authenticating the first end-user device by the ZTNA proxy, based on a successful authentication, providing a unique session token to a firewall connector coupled with a network firewall, and establishing, by the firewall connector and a centralized management platform, a first connector tunnel for the private application traffic.

The securely routing private network traffic may include receiving the private network traffic at the firewall connector coupled with the network firewall, inspecting the private network traffic based on rules related to network traffic at a transport level, and upon successful inspection, establishing a second connector tunnel for the private network traffic.

The filtering and monitoring Internet traffic may include receiving a request for the Internet traffic from the third end-user device, filtering the Internet traffic using one or more security policies, and after filtering, establishing a secure connection for the Internet traffic.

When the method of the presently claimed invention is performed by a non-transitory computer-readable storage medium, a processor executing instructions out of a memory may also include securely routing private application traffic from a first end-user device to a private network, securely routing private network traffic from a second end-user device to the private network, and filtering and monitoring Internet traffic for a third end-user device from the Internet or a Software-as-a-Service (SaaS) application.

An system of the presently claimed invention may include a centralized management platform and a firewall connector, the centralized management platform and the firewall connector including memory, one or more processors executing instructions out of the memory, and a network interface that include securely routing private application traffic from a first end-user device to a private network, securely routing private network traffic from a second end-user device to the private network, and filtering and monitoring Internet traffic for a third end-user device from the Internet or a Software-as-a-Service (SaaS) application.

DETAILED DESCRIPTION

Figure 1:
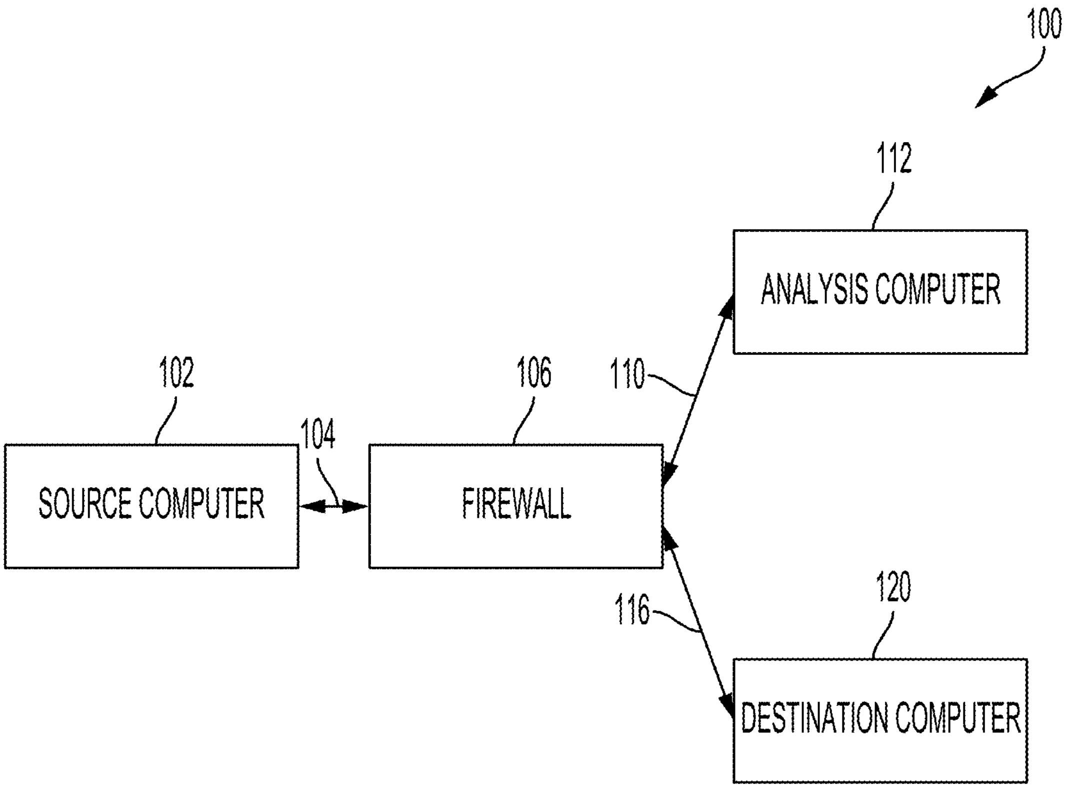
FIG. 1 illustrates an example diagram with a firewall communicating with an analysis computer when data packets sent from a source computer are received by and sent from the firewall.

The proliferation of remote workforces and IoT devices has further complicated this landscape, as each new endpoint adds an additional layer of complexity and potential vulnerability. As a result, organizations are struggling to maintain the level of visibility and control needed to effectively secure their networks and protect against emerging threats.

In addition, the increasing reliance on cloud-based services has created a new set of security concerns around data sovereignty and compliance. Organizations should ensure that sensitive data is properly protected and compliant with relevant regulations. Furthermore, they should also provide users with seamless access to the resources they need to be productive. As such, many organizations are finding it difficult to maintain the level of network visibility and control needed to effectively secure their hybrid environments. The result is a heightened risk of security breaches, data loss, and compliance issues that can have significant business impacts.

In addition, a key limitation of network firewall appliances is their rigid feature set, e.g., configurable packet filtering rulesets, VPN gateway interfaces, etc. To get new or improved features or fixes for performance, functionality, or security issues, firewall administrators have to update the appliance's firmware. This operation can be heavyweight and burdensome for the administrator. Moreover, the hardware capacity of a firmware appliance is fixed and often for cost reasons not sized to handle future functionality. These constraints are fundamental and necessarily slow the pace of development for firmware updates severely, and they tightly limit the ultimate performance and functionality that is possible to deliver through updates over time.

Furthermore, typically network firewall appliances are updated much less frequently than systems that can leverage the flexibility of cloud infrastructure, on the order of several months or even years. In addition, network appliances have other well known limitations in terms of user experience and management. Network firewalls are managed and configured through a local command-line or by accessing a web portal that is built into the appliance. Much of the configuration is based on low-level networking concepts and may require administrators to specify policies based on Internet Protocol (IP) address assignments instead of higher-level security objectives. Many vendors also provide cloud-based management allowing a central web portal to view and configure multiple firewalls, but the basic interface is the same.

What is needed are new methods and systems that provide seamless and secure connectivity between firewalls and cloud-based services, while also enabling real-time management of access to those resources and ensuring compliance with relevant regulations. To address these realities, a scalable and comprehensive approach to safe, secure access and device-centric access to the applications, resources, and information your workforce needs are needed.

FIG. 1 illustrates an example diagram 100 with a firewall communicating with an analysis computer when data packets sent from a source computer are received by and sent from the firewall.

FIG. 1 includes a source computer 102, a firewall 106, an analysis computer 112, and a destination computer 120. FIG. 1 also includes communications 104 sent to/from the destination computer 120 via firewall 106, communications 116 sent to/from the destination computer 120, and communications 104 sent between the firewall 106 and the analysis computer 112. This basic framework is from which the present disclosure may be based upon.

Communications 104 may be transmitted over a computer network such as the Internet, that communications 116 may be sent over computer network interfaces at the firewall 106 and at the destination computer 120, and that communications 110 may be sent between the firewall and the analysis computer via computer network interfaces at the firewall 106 and the analysis computer 112. Additionally, any of the computer networks over which communications 104, 540, and 560 are sent may include wired or wireless network interfaces. Analysis computer 112 may also be remote from firewall 106 and analysis computer 112 may reside in the Cloud. Network interfaces associated with the present disclosure may include any form of wired or wireless network interface known in the art.

The various components of FIG. 1 may implement functions associated with the receipt and analysis of computer data that may have been requested by destination computer 120 and have been provided by source computer 102. In such instances, firewall 106 and analysis computer 112 may perform functions consistent with receiving packets, providing messages, or analyzing computer data sent from source computer 102 when identifying whether the requested downloaded data includes malicious content. As such firewall 106 and analysis computer 112 may perform functions consistent with the present disclosure, including those functions described in respect to FIG. 2 to FIG. 14.

Figure 2:
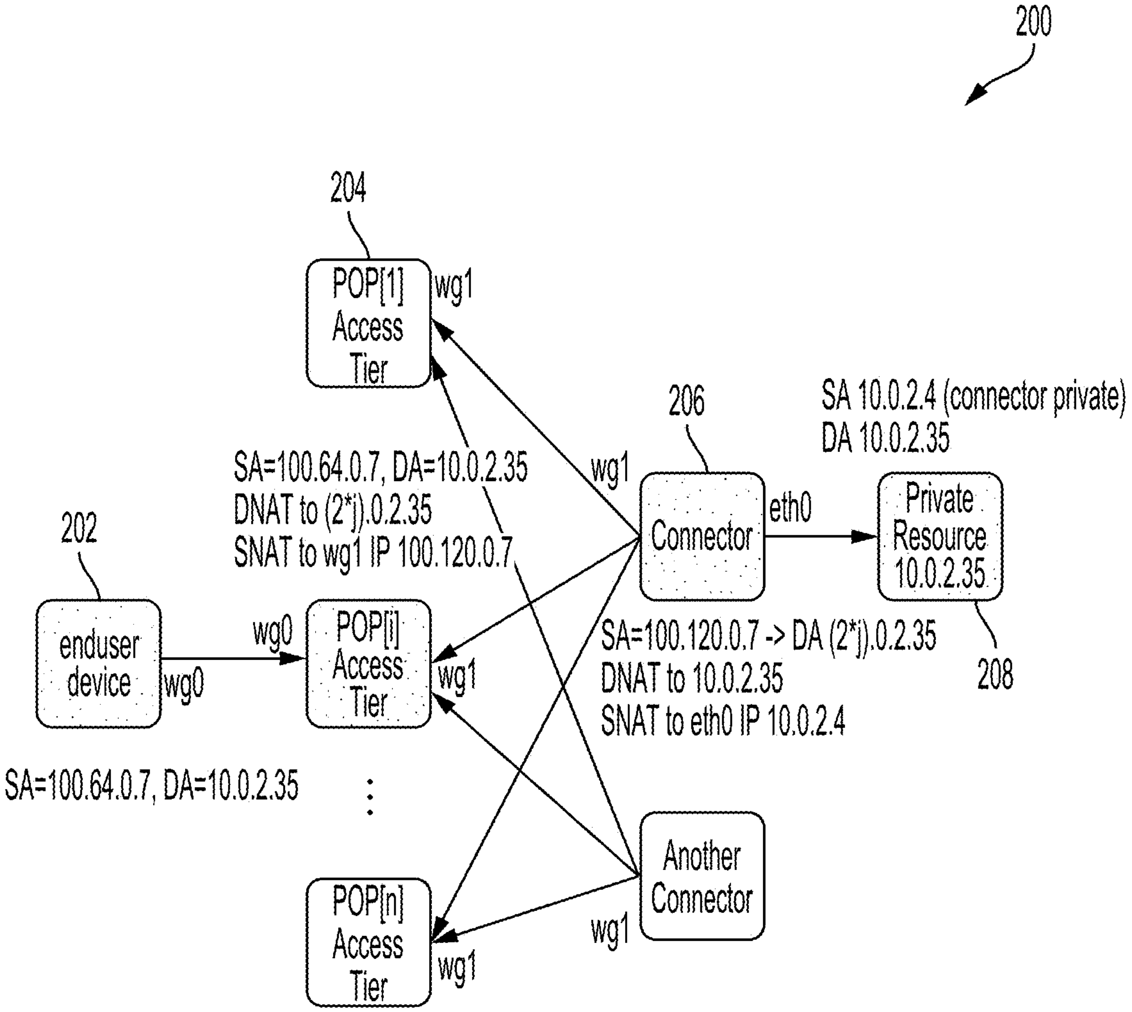
FIG. 2 illustrates an example packet flow diagram consistent with the present disclosure.

FIG. 2 illustrates an example packet flow diagram 200 consistent with the present disclosure.

The example packet flow diagram 200 illustrates an end-user device establishing peering with an access tier in a particular Point of Presence (POP), undergoes policy enforcement and Destination Network Address Translation (DNAT), and then transverses through multiple Network Address Translations (NATs) in a Global Edge network to reach its final destination in a private network.

The Global Edge network may comprise of access tiers hosted and managed by an organization, such as Sonicwall. The Global Edge network infrastructure may provides access to the Internet and other external networks from various locations around the world. The Global Edge network may be a global network of nodes (Points of Presence) that are strategically located to provide high-performance connectivity to users, devices, and applications. These nodes are designed to minimize latency and ensure reliable communication across different regions and countries.

For example packet flow diagram 200, the Global Edge is a cloud-based or hybrid infrastructure that enables secure, private access to the Internet and other networks while also providing features such as: high-speed connectivity, low-latency routing, advanced security measures (e.g., firewalls, encryption), and scalability and reliability By using the Global Edge network, users may establish connections with remote servers, services, or applications while keeping their internal network and devices isolated from the public Internet.

The peering may be established by setting up a secure, encrypted connection between two nodes or devices, such as an end-user device 202 and a. In some cases, a WireGuard protocol may be used. The WireGuard protocol may be an open-source encryption technology designed for establishing secure, reliable, and high-performance Virtual Private Networks (VPNs). WireGuard may provide end-to-end encryption, authentication, and key exchange for secure data transfer between two nodes or devices.

The end-user device 202 may set up peering with an access tier in a lowest network latency POP (e.g., POP access tier 204) in the Global Edge (for private access). Latency-based Domain Name System (DNS) is used to resolve a shared Fully Qualified Domain Name (FQDN) to the right POP. In the diagram above, a particular end-user device 202 is shown peered to a particular POP access tier 204, the "i-th" POP or "POP[i] Access Tier".

The end-user device 202 may send a packet to a destination address in the private network behind a firewall connector 206. The packet may traverses to the peer, which is an access tier in the same POP. Each firewall connector 206 may set up simultaneous peering (or specifically, WireGuard peering) with access tiers in every POP in the Global Edge.

The example packet flow diagram 200 illustrates an example packet flow. In this example, the end-user device 202 has a wg0 address 100.64.0.7, which is unique for this end-user device 202 and assigned to it from the centralized management platform. The end-user device 202 sends a packet from this IP address to destination address 10.0.2.35 in the private network behind the firewall connector 206. In this example, the packet traverses to the peer, the POP [i] Access Tier (more generally, POP access tier 204).

At POP access tier 204, the packet may undergoes L4 policy enforcement and may get forwarded, or dropped with a Internet Control Message Protocol (ICMP) reject returned to the client. If the packet is allowed by L4 policy, it undergoes Destination Network Address Translation (DNAT) to a "virtual" IP address space that is flat, such that no two connectors have overlapping network address spaces in the virtual IP address space, even if the connectors do have overlapping addresses.

In some cases, a unique integer value ("j") is assigned to each firewall connector 206, e.g., 1 . . . 127. In the flat address space, the firewall connector 206 is allocated addresses (2*j).0.0.0/7. For example, if the connector is assigned j=20, then it would have addresses 40.0.0.0/7 in the flat virtual address space (which is the same as 40.0.0.0/8 plus 41.0.0.0/8). Destination addresses in a Request for Comment (RFC) 1918 ranges may be DNAT-ed as follows:

$$10.0.0.0/8 \rightarrow 2*j.0.0.0/8$$

$$172.16.0.0/12 \rightarrow (2*j+1).16.0.0/12$$

$$192.168.0.0/16 \rightarrow (2*j+1).168.0.0/16$$

After the packet is DNATed, the POP access tier 204 may forward the packet on the wg1 interface to the firewall connector 206 (the right peer is selected based on the IP address in the virtual address space). The packet is also SNAT-ed, to the access tier's wg1 IP address. When the packet reaches firewall connector 206, its source address is the access tier's wg1 IP address, and the destination address is the virtual address.

firewall connector 206 may have iptables rules that DNAT the packet back to the original destination IP—the rules reverse the arrows in the table above. The packet will be Source Network Address Translationed (SNAT-ed) to the connector's IP address on the private network, and then forwarded to the private network behind the connector using the standard interface, e.g., eth0. All the NATs are stateful, and so reply traffic may traverse the reverse path.

In some cases, the SNATs remove the IP address of the end-user device 202 from the packet when it arrives at the private resource 208. This might not be desirable for some uses cases. Thus, for some use cases, it may be needed to preserve the source IP address (100.64.0.7 in our example) of the end-user device 202. In some cases, there is an advanced mode that logically disables SNAT at the POP access tier 204 and at the firewall connector 206. In some case, the implementation may be achieved by SNAT-ing the IPs of the end-user device 202 to a unique range of IPs for each POP access tier 204, and then translating back to the original IPs of the POP access tier 204 at the firewall connector 206.

Figure 3:
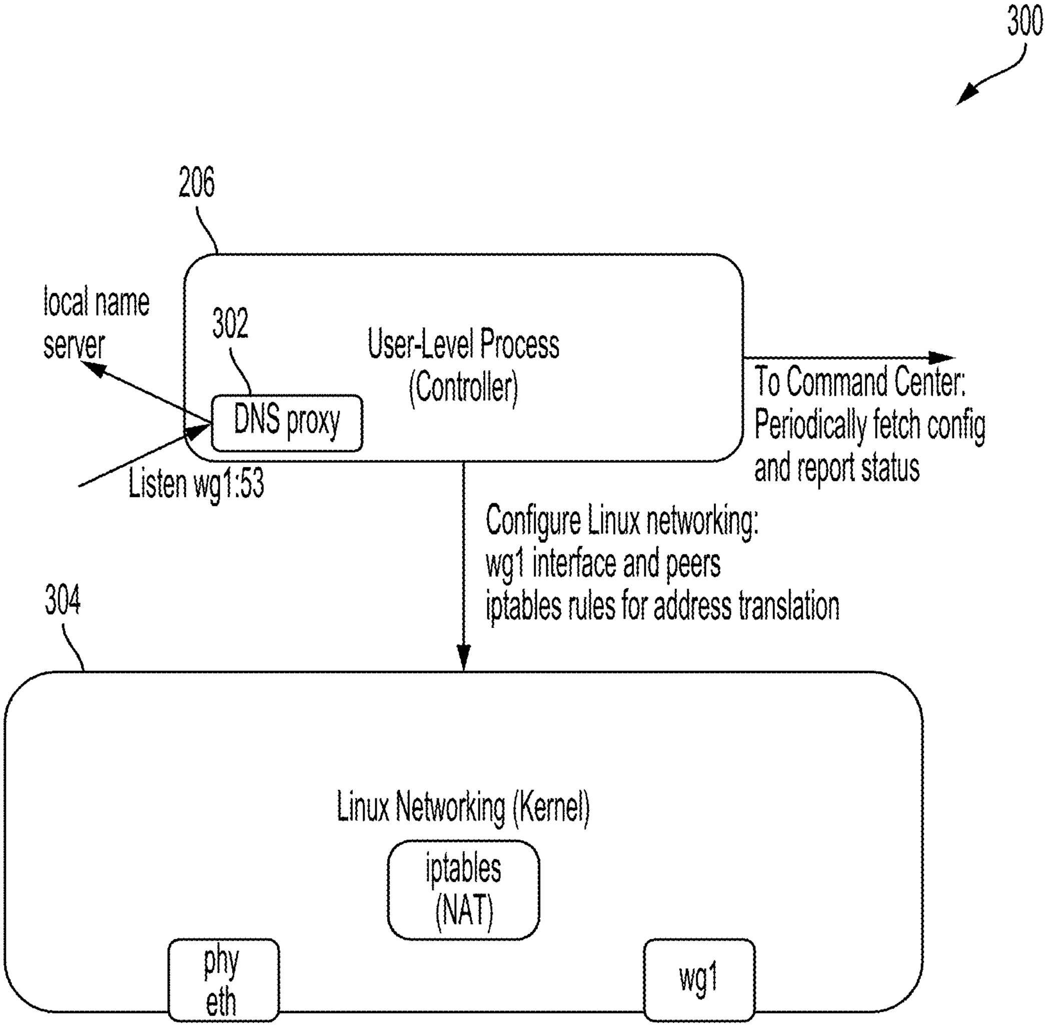
FIG. 3 illustrates an example process architecture of an example connector.

FIG. 3 illustrates an example process architecture 300 of an example connector.

The example process architecture 300 is directed at managing and configuring an example firewall connector 206. The firewall connector 206 may be a Go executable, which refers to a standalone binary file that contains compiled code of a Go program. The firewall connector 206 has four main functions: (1) periodically fetching its configuration from a centralized management platform 412 (e.g., a Hypertext Transfer Protocol Secure (HTTPS) Application Programming Interface (API) call), (2) configure Linux networking 304 according to the configuration fetched from the Command Center, (3) periodically reporting Connector status to the Command Center (e.g., a HTTPS API call), and (3) proxying remote end-user DNS queries to the local name server.

In some cases, a DNS proxy 302 may be replaced with iptables DNAT rules in the future, though it may be at the cost of losing some flexibility. The HTTPS API calls may need a Centralized management platform Uniform Resource Locator (URL), a connector name, and a (secret) API key. These values may be provided in a Yet Another Markup Language (YAML) configuration.

For the configuration downloaded from the Centralized management platform, the downloaded config may be a JavaScript Object Notation (JSON) with the following fields:

```
type SatelliteTunnelConfig struct {
ID string ‘json:"id"‘
OrgID string ‘json:"org_id"‘
Name string ‘json:"name"‘
DisplayName string ‘json:"display_name"‘
TunnelIPAddress string ‘json:"tunnel_ip_address"‘
Keepalive int64 ‘json:"keepalive"‘
WireguardPublicKey string ‘json:"wireguard_public_key"‘
WireguardPrivateKey string ‘json:"wireguard_private_key,omitempty"‘
CIDRs [ ]string ‘json:"cidrs"‘
AccessTiers [ ]AccessTier ‘json:"access_tiers"‘
CreatedAt int64 ‘json:"created_at,omitempty"‘
UpdatedAt int64 ‘json:"updated_at,omitempty"‘
APIKeyID string ‘json:"api_key_id,omitempty"‘
SSHCAPublicKey string ‘json:"ssh_ca_public_key,omitempty"‘
CreatedBy string ‘json:"created_by"‘
UpdatedBy string ‘json:"updated_by"‘ Spec string ‘json:"spec"‘
Domains [ ]string ‘json:"domains"‘ Description string ‘json:"description"‘
}
```

-continued

```
In some cases, the "access_tiers" field may indicate the peers, such as WireGuard
peers, to configure. Each element may be an objection with the following fields:
type AccessTier struct {
SatelliteTunnelPeerID string 'json:"satellite_tunnel_peer_id"'
AccessTierID string 'json:"access_tier_id"'
WireguardPublicKey string 'json:"wireguard_public_key,omitempty"'
Endpoint string 'json:"endpoint,omitempty"'
AllowedIPs string 'json:"allowed_ips,omitempty"'
AccessTierName string 'json:"access_tier_name,omitempty"'
SrcNATCIDRRange string 'json:"src_nat_cidr_range,omitempty"'
}
```

In some cases, the firewall connector 206 uses the configuration above to set up an interface, such as a WireGuard interface "wg1", assigns it the IP address given by "tunnel_ip_address", and assigns it the public and private keys "wireguard_public_key" and "wireguard_private_key". The firewall connector 206 may add peers, such as WireGuard peers, according to the "access_tiers" array. To support connector networks that have overlapping IP ranges, a technique based on network address translation to form a non-overlapping virtual IP address space may be implemented. At POP access tier 204, packet destination IPs in the RFC 1918 ranges are translated to the non-overlapping virtual IP address space, and then at firewall connector 206, a reverse translation may be applied that restores the original RFC 1918 destination IP address. To perform this reverse translation, three static NAT rules may be installed:

```
*nat
:PREROUTING ACCEPT [2793:207170]
:INPUT ACCEPT [2793:207170]
:OUTPUT ACCEPT [3305:211710]
:POSTROUTING ACCEPT [3305:211710]
:BANYAN_CONNECTOR_POST - [0:0]
:BANYAN_CONNECTOR_PRE - [0:0]
-A PREROUTING -j BANYAN_CONNECTOR_PRE
-A POSTROUTING -j BANYAN_CONNECTOR_POST
-A BANYAN_CONNECTOR_POST -s 100.120.0.1/32 -j MASQUERADE
-A BANYAN_CONNECTOR_POST -s 100.120.0.2/32 -j MASQUERADE
-A BANYAN_CONNECTOR_POST -s 100.120.0.0/32 -j MASQUERADE
-A BANYAN_CONNECTOR_PRE -d 10.125.0.0/32 -i wg1 -j ACCEPT
-A BANYAN_CONNECTOR_PRE -d 0.0.0.0/1.0.0.0 -i wg1 -j NETMAP --to
10.0.0.0/8
-A BANYAN_CONNECTOR_PRE -d 1.16.0.0/1.240.0.0 -i wg1 -j NETMAP --to
172.16.0.0/12
-A BANYAN_CONNECTOR_PRE -d 1.168.0.0/1.255.0.0 -i wg1 -j NETMAP --
to 192.168.0.0/16
```

These rules may translate packet destination IPs to the RFC 1918 range. The translations may reverse the destination IP address translations that are performed at the peer access tiers, restoring the original destination IP address. The MASQUERADE rules are source NAT rules that change the source IP to the firewall connector 206 host's IP address. This SNAT may avoid the need to change routes in the network behind the Connector. In some cases to support non-RFC 1918 IPv4 destination addresses, the address translation mechanism may be replaced with a tunnel mechanism like Geneve over WireGuard.

In some cases, the firewall connector 206 reports status info to Centralized management platform periodically, using a JSON object with the following fields:

```
type PeersStatus struct {
ConnectorVersion *string 'json:"connector_version,omitempty"'
HostInfo *HostInfo 'json:"host_info,omitempty"'
Peers [ ]SatellitePeerStatus 'json:"peers"' }
type HostInfo struct {
Name string 'json:"name"'
IPAddresses [ ]string 'json:"ip_addresses"'
Details map[string]string 'json:"details"' }
type SatellitePeerStatus struct {
AccessTierID string 'json:"access_tier_id"' Healthy *bool 'json:"healthy"'
WireguardPublicKey string 'json:"wireguard_public_key"' Endpoint string
'json:"endpoint"'
AllowedIPs string 'json:"allowed_ips"'
```

-continued

```
LatestHandshake string 'json:"latest_handshake"'
Transfer string 'json:"transfer"'
}
```

Client DNS requests may need to get routed to the local name server(s). Connector proxies may requests through the user-level Connector Go executable, providing flexibility. For example, transparent retries or cycling may be allowed through the name server IPs. An alternative approach could be to add an iptables DNAT rule which would forward DNS queries directly to the local name server's IP, bypassing the Go executable.

Figure 4:
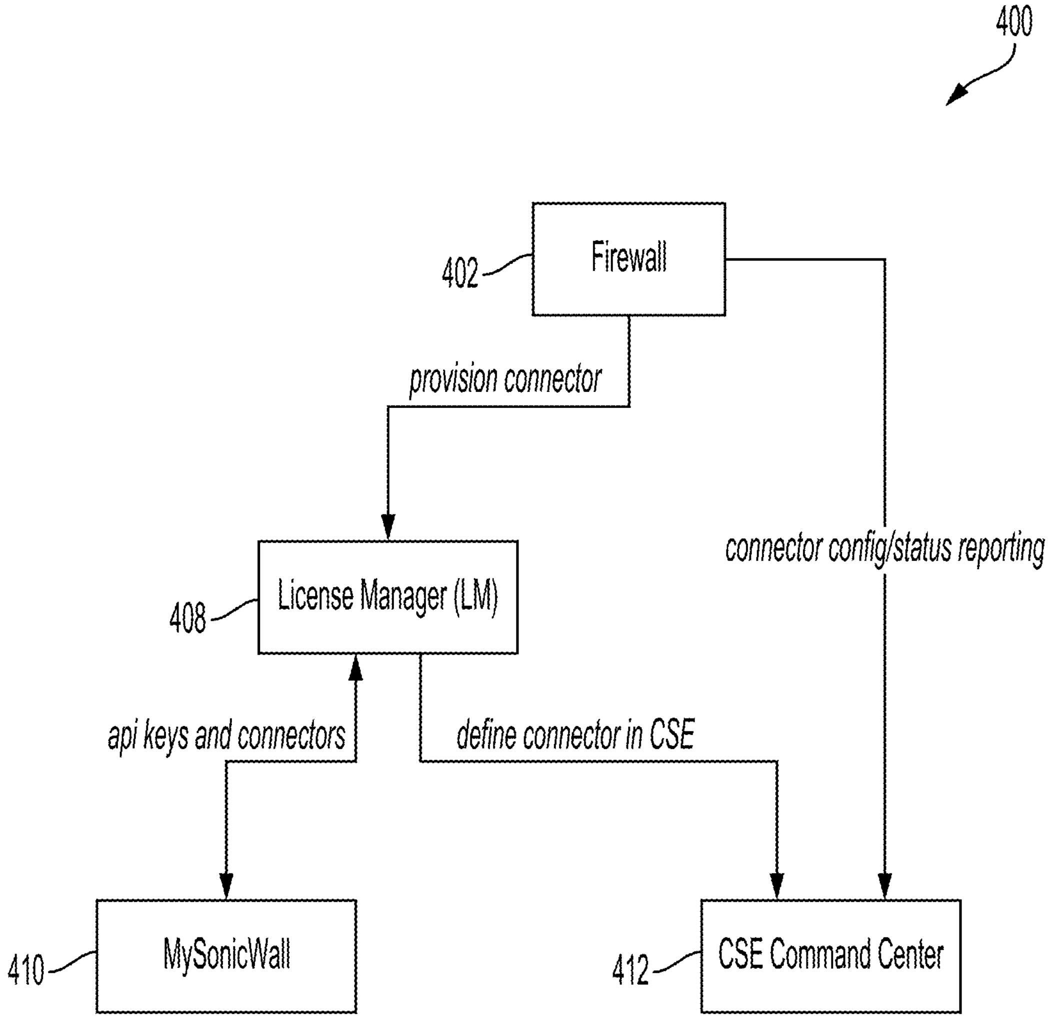
FIG. 4 illustrates an example control relationship diagram of a cloud secure network.

FIG. 4 illustrates an example control relationship diagram of a cloud secure network 400.

The cloud secure network 400 is a hybrid security solution that combines an access control service 410 ("MySonicWall") that enhances the capabilities of traditional firewalls with the advanced threat protection and visibility capabilities of a combination of Zero Trust Network Access (ZTNA) and Security Services Edge (SSE). The access control service 410 may provide SaaS application access security, and more specifically layered security that provides easily managed controls to enforce who, using what specific devices, can access a user's SaaS applications. The access control service 410 may be based on a combination of strengths of ZTNA and SSE and may be integrated with a firewall connector 206 coupled to one or more network firewalls that allows customers to leverage the benefits of cloud-based ZTNA/SSE while still using their familiar firewall appliances. In providing ZTNA, application and infrastructure access is simplified with privilege access to applications and services across hybrid- and multi-cloud infrastructure, leveraging existing enterprise identity and security tool investments. Such a unified system enables customers to enjoy advanced security capabilities, scalability, and agility without having to switch to a new solution.

The cloud secure network 400 may provide a unified platform for securing access to cloud-based resources, while also enforcing Zero Trust Network Access policies. This combination offers enhanced security, visibility, and control for users accessing cloud applications, SaaS services, and other remote resources. Furthermore, the firewall may leverage the ZTNA/SSE's cloud-based security services, while also providing a unified view of network traffic and user activity.

The cloud secure network 400 may offer enhanced threat detection and prevention, improved visibility into network traffic and user activity, simplified security management and policy enforcement, and integration with cloud-based applications and services. Thus, by leveraging the access control service 410, the firewall becomes a more effective and intelligent security solution that can adapt to the evolving threats and risks in today's cloud-centric environment. Additionally, the access control service 410 securely connects users to applications, resources, and infrastructure while protecting them from internet threats. Risk and security are continuously evaluated, incorporating telemetry from existing security tools. In short, the cloud secure network 400 enables "Work from Anywhere" for modern organizations, allowing users, regardless of location, to safely and securely access corporate and internet resources.

Additionally, the firewall connector 206 is designed to seamlessly integrate with existing firewall data and control paths, allowing for accelerated packet inspection and leveraging firewall-specific features. Provisioning is orchestrated through a centralized management platform 412, including a single-pane-of-glass management portal that is provided by an access control service 410, a license manager 408, and a centralized management platform 412. This solution enables firewalls, such as SonicWall firewalls, to join a ZTNA/SSE integration, such as SonicWall Cloud Secure Edge ZTNA/SSE, providing customers with a unified network security solution that delivers advanced capabilities and scalability.

FIG. 4 illustrates the control relationships between the various components. The firewall with connector 402 may send requests to the license manager 408 to initiate connector provisioning. After provisioning, the firewall with connector 402 may periodically send requests to the centralized management platform 412 (e.g., Cloud Secure Edge (CSE) centralized management platform) to get updates on connector configuration and to send updates about connector tunnel performance and availability.

The license manager 408 may also define the firewall connector 206 in a centralized management platform 412. In addition, the license manager 408 may send requests to centralized management platform 412 to provision connector configurations on behalf of tenants and firewalls 106. The license manager 408 may interface with an access control service 410, such as a MySonicWall portal, which may issue centralized management platform keys of org-level scoping to the license manager 408. The access control service 410 may also provision tenants in the centralized management platform 412.

Figure 5:
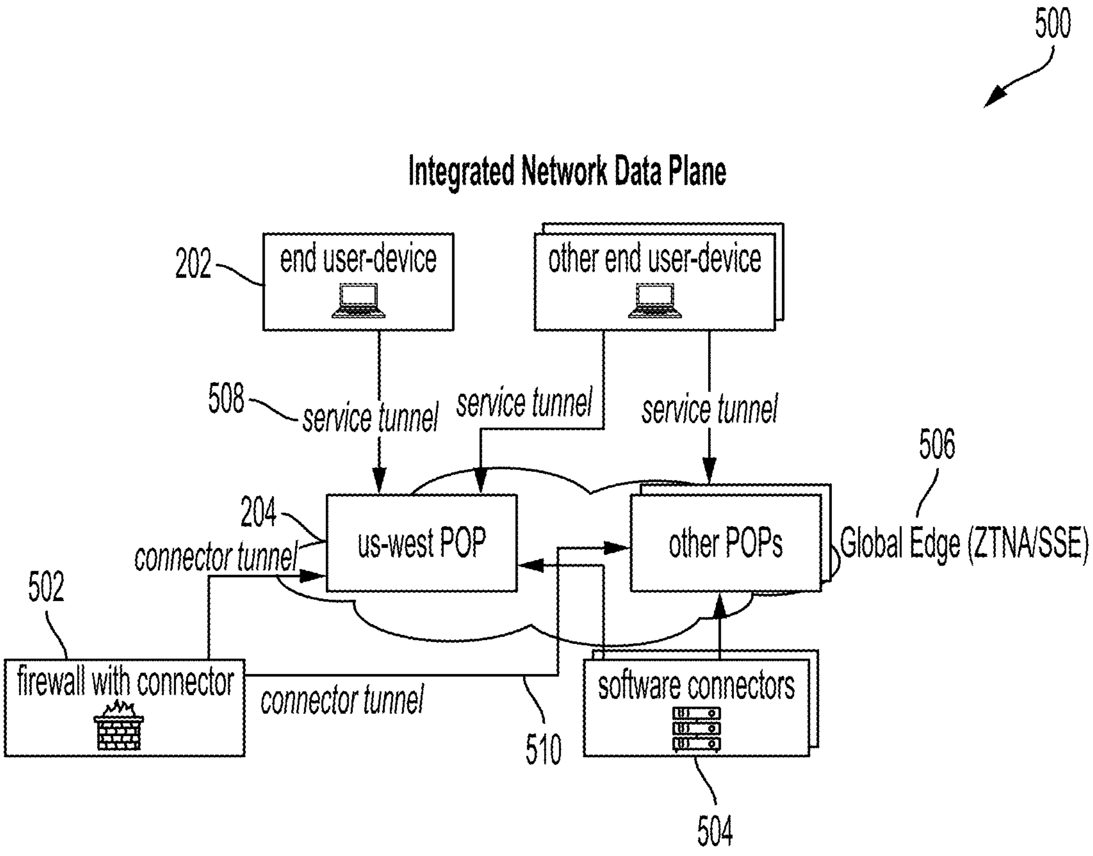
FIG. 5 illustrates an example integrated network data plane.

FIG. 5 illustrates an example integrated network data plane 500.

The example cloud secure network 400 that combines a firewall with an access control service 410 may be integrated into a larger integrated network data plane 500. The integrated network data plane 500 may be centered on the Global Edge network 506 (ZTNA/SSE), where each firewall with connector 502 establishes a tunnel to each Point of Presence (POP) in the Global Edge network 506. End-user devices can establish service tunnels 508 to their nearest POP, and traffic flows through these tunnels for policy enforcement before being forwarded to the appropriate private network. Each remote end-user device 202 can establish a service tunnel connection to its nearest POP. Network traffic may flow from the end-user device 202 over the service tunnel 508 to the POP, where the traffic undergoes policy enforcement. Traffic that is allowed by policy is then forwarded over the connector tunnel 510 to the software connectors 504 in the appropriate private network, according to specified routes. Software connectors 504 provide a pure software ZTNA/SSE solution (without firewalls) that may also deployed as a pure software connector component in a customer's private networks.

With network security developed and delivered as a modern cloud-based service, benefits to customers include higher performance, better user experience, and better security control and visibility of accesses to private resources. Furthermore, Zero Trust Network Access (ZTNA) architectures offers a pure software cloud service that provides ZTNA service to customers without the use of network firewalls or other such appliances. ZTNA provides remote end users access to private resources (compute and data) in a customer's private networks. Unlike a traditional VPN, the ZTNA approach provides Least Privilege Access (LPA) from each user and device to each private resource, without assuming that certain networks can simply be trusted. Every access is authenticated and authorized by policy explicitly.

Additionally, Security Services Edge (SSE) may include the functionality of ZTNA and takes the same basic architectural approach, providing a software service designed for and deployed on flexible, scalable cloud infrastructure. The additional features are largely around securing access to public Internet resources. While ZTNA protects private resources from unauthorized access, the Internet protection capabilities in SSE protect users and devices from malicious or inappropriate content available on the public Internet (some other use cases include a mixture, such as prevention of data exfiltration from private resources to public Internet resources).

A key advantage of cloud-based ZTNA/SSE solutions over network appliances is simplicity of management. A central web-based or API-driven management portal allows administrators to express policies in an intuitive interface that is focused on users, devices, and private and Internet resources, as opposed to low-level network IP addresses.

Additionally, for integration/implementation of Global Edge functionalities on the firewall, the connector in the firewall with connector 502 may have separate control and data components. The software connectors 504 (Linux and Windows) may have a similar organization: control is provided in user space, while the data plane is in the kernel space (based on WireGuard currently). The control component may interact with the centralized management platform 412, and may configure and monitor the WireGuard interfaces in the data plane. In the firmware, Computer Processing Unit (CPU) cores are dedicated for control or data plane processing. The connector control component may run as a software thread of execution on one of the control cores.

All the WireGuard processing of network packets may be handled in the data plane CPU cores. The firewall control components may need to set up a chain of packet processing steps that packets will follow through the data plane cores. For example, certain packets need to be passed through a firewall rulesets, and the rulesets a particular packet may use can depend on the properties of the individual packet. The control components set up packet handling in the data plane to direct each packet to the appropriate rulesets and additional data plane processing.

Figure 6:
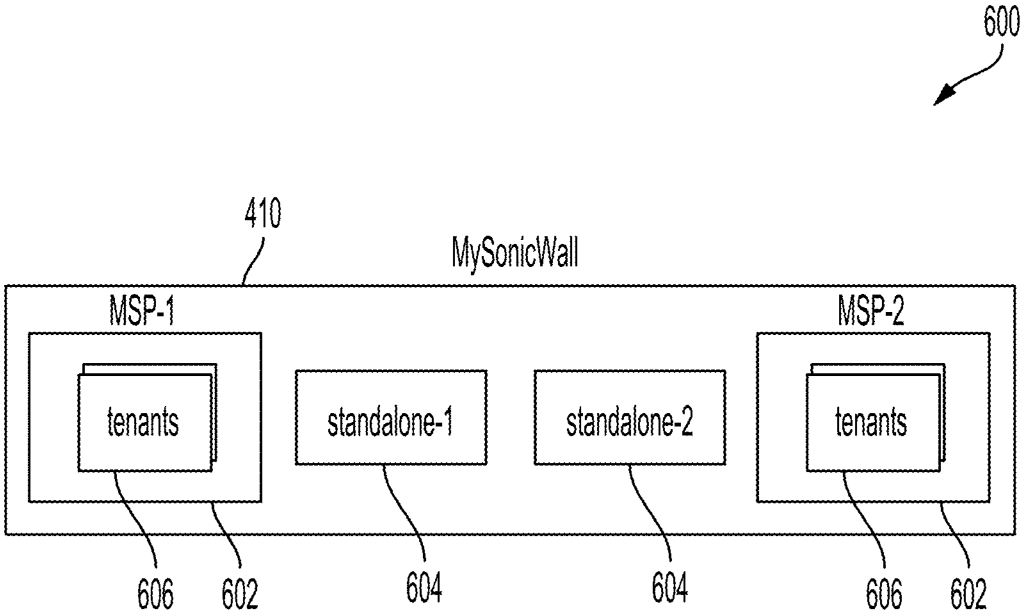
FIG. 6 illustrates an example diagram of the access control service that provides a web-based portal that gives customers a single pane interface to manage security solutions.

FIG. 6 illustrates an example diagram 600 of the access control service 410 that provides a web-based portal that gives customers a single pane interface to manage security solutions.

The access control service 410 ("MySonic Wall") may provide customers, who may be Managed Service Providers (MSPs) 602 that manage security solutions for their multiple standalone end customers 604 or tenants 606. Alternatively, sometimes standalone end customers 604 use the access control service 410 without being tenants 606 of an MSP 602.

The access control service 410 may offer several capabilities, including:

- provisioning a child tenant 606 for each end customer or MSP 602;
- assigning MSPs 602 access rights to the child tenants 606—rights can be read-only, or admin; and
- managing product licenses for the child tenants 606.

Provisioning organizations for MSP 602 and child tenants 606 may involve adding users, and configuration access controls for the users. Organization provisioning may be an asynchronous operation that involves creating and configuration some cloud infrastructure. Individual steps in this provisioning process can fail, and a recovery mechanism may automatically retry provisioning until it succeeds or until a practical timeout deadline is crossed. The user may interact with access control service 410 through a web browser. The browser may make a call to access control service 410 to request to provision. Access control service 410 may then makes a series of calls to a service of the centralized management platform 412 to provision a MSP 602, provision a child organization for the tenant 606, and/or assign MSP users 602 with privilege to access the child organization.

Figure 7:
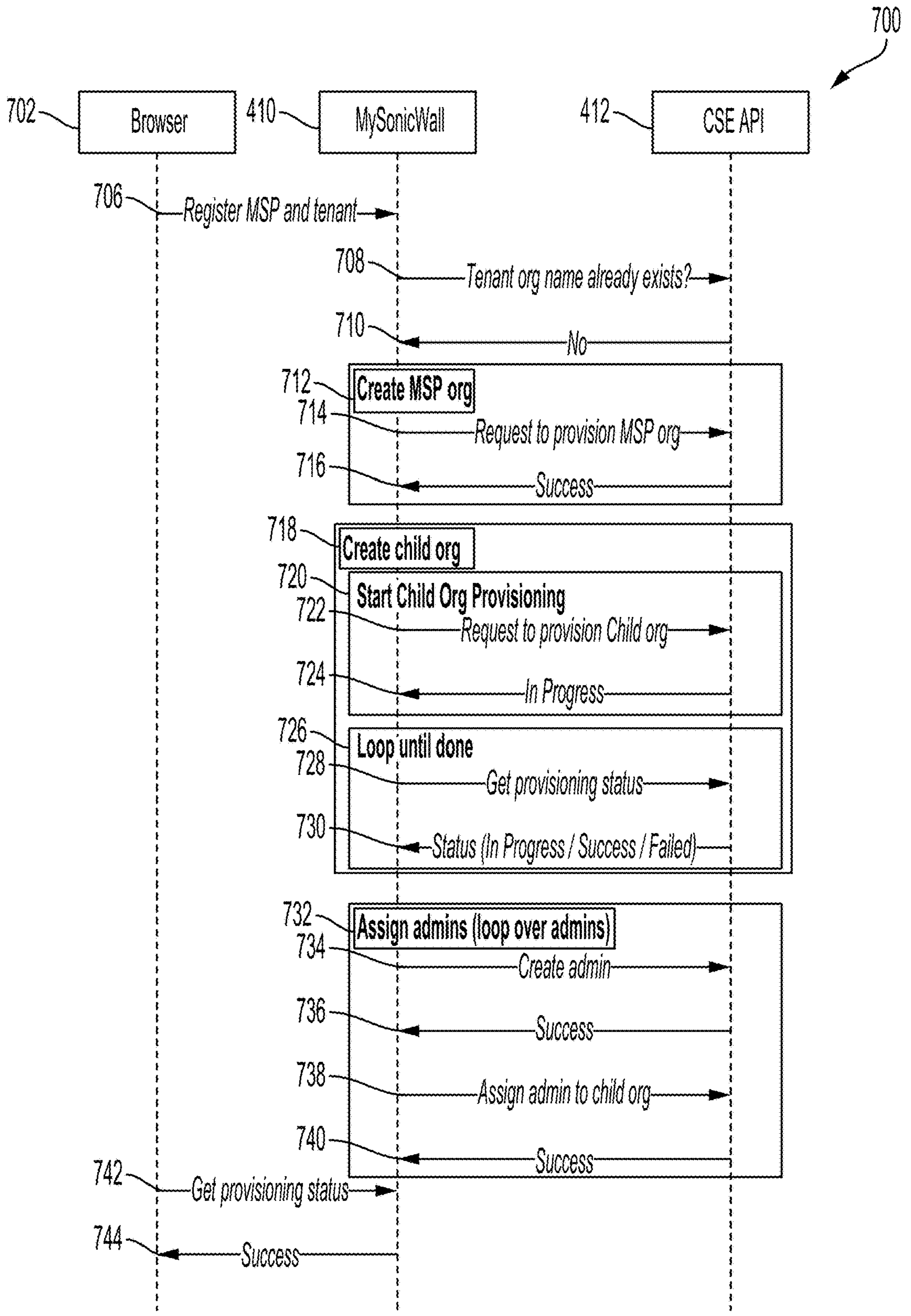
FIG. 7 illustrates an example flow diagram for organization provisioning.

FIG. 7 illustrates an example flow diagram 700 for organization provisioning.

In some cases, a browser may register (706) the MSP 602 and tenant 606 through the access control service 410. The access control service 410 may check (708) whether the tenant organization name already exists with a centralized management platform 412, or CSE API. If not, the centralized management platform 412 may indicate (710) that it is not.

The access control service 410 may create (712) the MSP organization. The access control service 410 may request to provision (714) the MSP organization with the centralized management platform 412. If and when successful, the centralized management platform 412 may indicate (716) as such to the access control service 410.

The access control service 410 may start (720) child organization provisioning by requesting (722) to provision the child organization with the centralized management platform 412. If and when in progress, the centralized management platform 412 may indicate (724) as such to the access control service 410.

The access control service 410 may loop (726) until done by getting (728) provisioning status from the centralized management platform 412. For each loop, the centralized management platform 412 may indicate (730) the status (e.g., in progress/success/failure) to the access control service 410.

The access control service 410 may assign (732) admins by creating (734) admins with the centralized management platform 412. If and when successful, the centralized management platform 412 may indicate (736) as such to the access control service 410. The access control service 410 may assign (738) admin to child organizations. If and when successful, the centralized management platform 412 may indicate (740) as such to the access control service 410.

The browser 702 may get (742) provisioning status from the access control service 410. If and when successful, the access control service 410 may indicate (744) as such to the browser 702.

Figure 8:
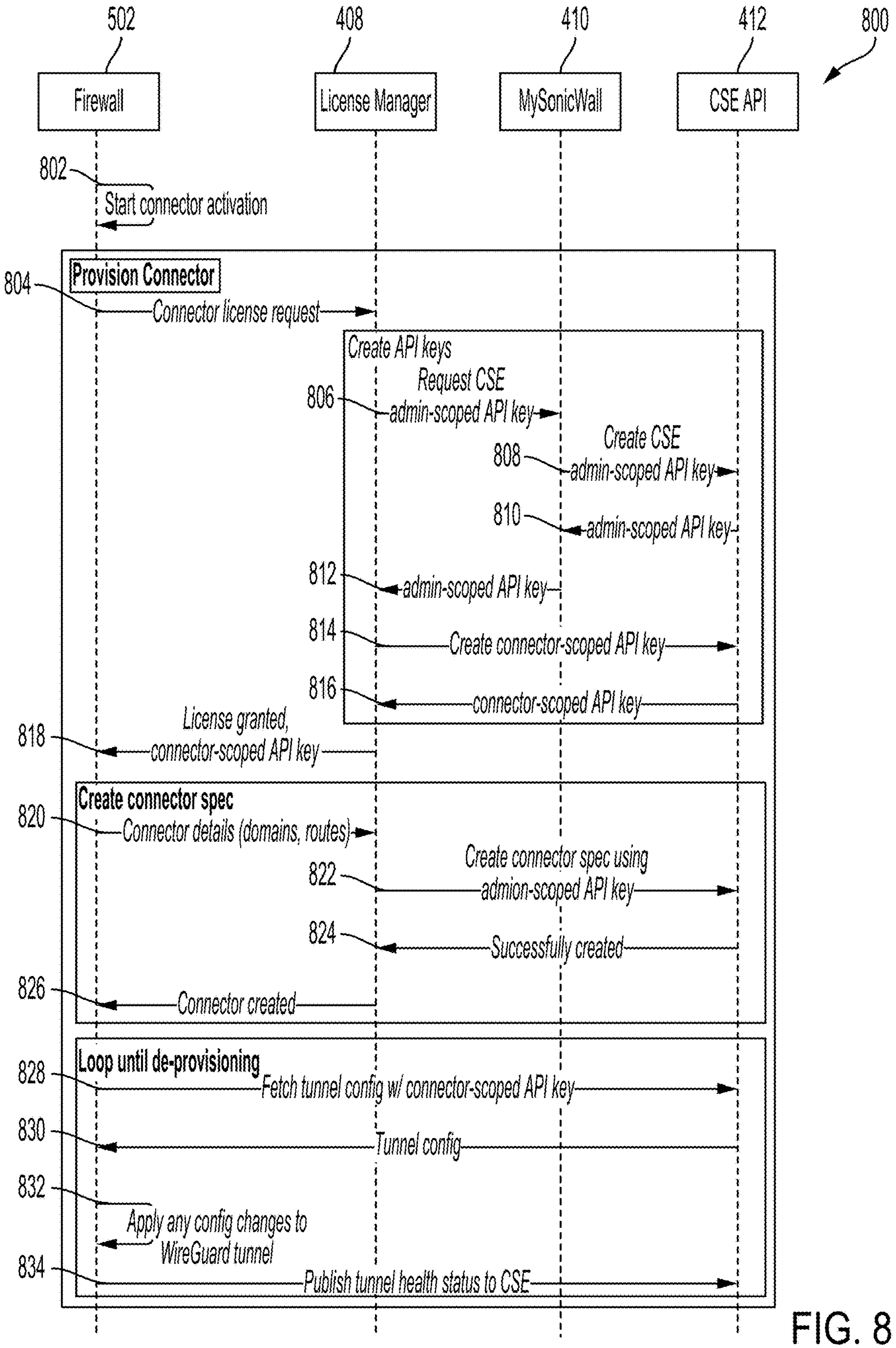
FIG. 8 illustrates an example flow diagram for provisioning through firewall.

FIG. 8 illustrates an example flow diagram 800 for provisioning through firewall.

Once the access control service 410 has successfully provisioned organizations through the centralized management platform 412 or CSE API, a firewall administrator can proceed to activate (802) the connector component of the firewall with connector 502. The firewall administrator can trigger connector activation using familiar mechanisms, such as firewall Command Line Interface (CLI), firewall web interface, or network management service software.

The trigger may be a simple on-off switch, e.g., in the web interface the administrator would just click a button to activate.

This trigger may kick off a sequence of operations in the firewall to provision the firewall connector 206. The firewall connector 206 may request for (804) a license through license manager 408 and sends license manager 408 a list of local network routes and private DNS domains. License manager 408, in conjunction with access control service 410, may utilize this information from the firewall with connector 502 to provision a JSON specification for the firewall connector 206 in the centralized management platform 412.

Specifically, to create an API key, the license manager 408 calls (806) the access control service 410, which in turn requests (808) the centralized management platform 412 to issue an org admin-scoped API key to license manager 408. The centralized management platform 412 may provide (810) the org admin-scoped API key to the access control service 410, which provides (812) the org admin-scoped API key to the license manager 408. The license manager 408 may use this org admin-scoped API key to provision (814) a connector-scoped API key in the centralized management platform 412, and then creates the connector specification in the centralized management platform 412. The connector specification may include a field that ties the connector the given connector-scoped API key. The centralized management platform 412 may provide (816) the connector-scoped API key to the license manager 408.

Finally, license manager 408 may return (818) the connector-scoped API key to the firewall connector 206. From this point onward, the firewall connector 206 may continue to use the connector-scoped API key to call the centralized management platform 412 over time, both fetching (820) its connector configuration and reporting connector tunnel status at appropriate times. The fetched connector configuration may indicate all the details of the WireGuard tunnel configuration that the firewall 106 needs to dial out securely to the CSE Global Edge (cloud data plane). The license manager 408 may call the centralized management platform 412 to create connector specs using the org admin-scoped API key, and when successfully created, the centralized management platform 412 may pass (824) the firewall connector 206 to the license manager 408 and then passed (826) to the firewall 106.

The connector tunnel status reports may indicate the connection status and traffic statistics of the firewall connector's WireGuard peers to the centralized management platform 412. Private routes may automatically get added to a default service tunnel that end users can connect to to obtain remote access to the private resources. All access may be controlled through Layer-4 policy rules in CSE that are enforced in the Global Edge, plus any additional policy controls that are set up in the firewall.

As such, the firewall with connectors 502 may fetch (828) tunnel config with connector-scoped API key from the centralized management platform 412 and the tunnel config may be sent (830) back to firewall with connector 502. The firewall with connector 502 may apply (832) any config changes to the WireGuard tunnel and publish (834) tunnel health status to centralized management platform 412.

Figure 9:
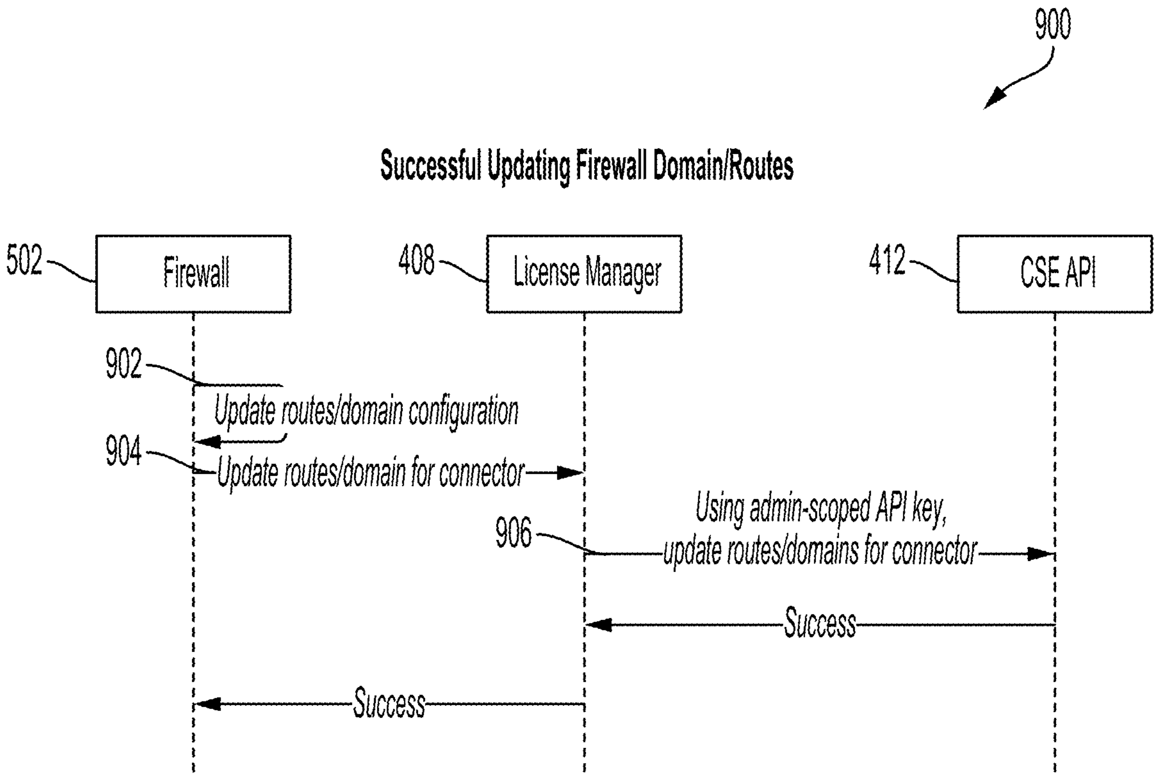
FIG. 9 illustrates an example flow diagram for successfully updating firewall domain/routes.

FIG. 9 illustrates an example flow diagram 900 for successfully updating firewall domain/routes.

The example flow diagram 900 of illustrates the management of connectors using a portal. Over time, firewall administrator can change the configuration of their firewall. For example, administrator may adjust the private domain names or local routes. Routes can be specified as a set of IP address ranges Classless Inter-Domain Routing (CIDR) notation, e.g., 10.0.0.0/8.

When the connector is enabled on the firewall, there may be updates (902) to routes and domains in the firewall configuration.

Furthermore, such updates may be automatically get propagated (904) through license manager 408 to the centralized management platform 412. Using the admin-scoped API key, routes/domains for the connector may be updated (906). As such, the connector spec may be updated, and the service tunnel available to end-user device 202 automatically gains reachability to the new routes (still controlled for individual users and devices by the layer-4 policy rules).

Figure 10:
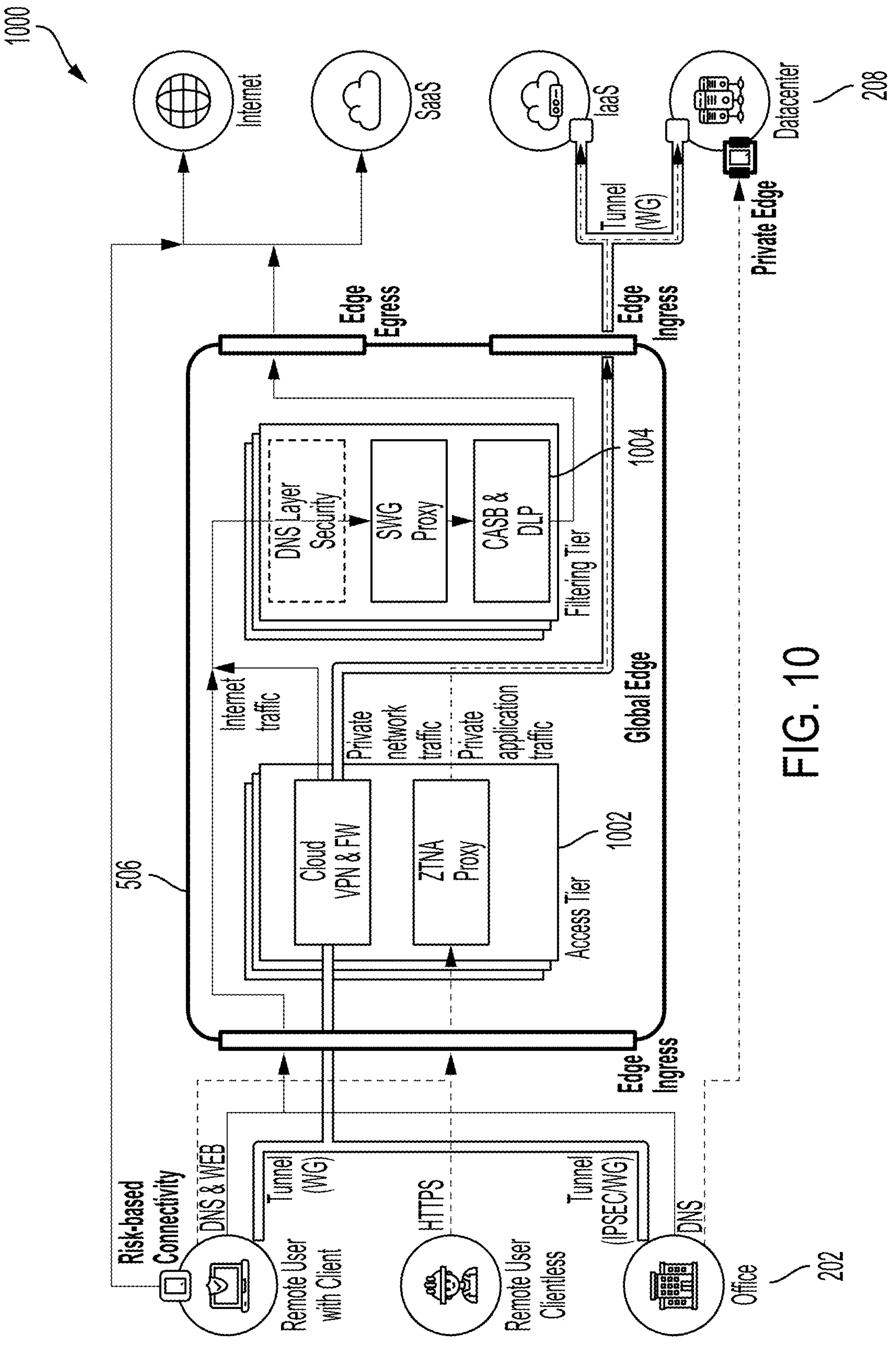
FIG. 10 illustrates an example unified platform.

FIG. 10 illustrates an example unified platform 1000.

The example unified platform 1000 may illustrate the flexibility of the platform (e.g., through the connector). The example unified platform 1000 can leverage hardware/cloud and private edge/Global Edge where needed for the best possible place to put the SSE functionality. This flexibility allows customers to choose operating modes that achieve a customized tradeoff of privacy, performance, agility, mix-and-match, etc. More specifically, providing an access tier 1002 that can receive both private application traffic (through the ZTNA proxy) and private network traffic and Internet traffic (through Cloud VPN & firewall with connector 502), provides the flexibility. The private network traffic and the private application traffic may be sent through the WireGuard tunnels to an Infrastructure-as-a-service (IaaS) or a private resource 208, such as a private datacenter. In addition, from an office directly to the private resource 208 may use Private Edge. The Private Edge may be connected to the Global Edge via WireGuard tunnels, which allows for secure communication between the two and enables the example unified platform 1000 to extend the private networks into the cloud or connect remote sites to their main infrastructure.

In the example unified platform 1000, the ability to write a simple policy is automatically translated into a shared responsibility between the user end-user device 202, the firewall with connector 502, and the Cloud POP to fulfill it. For example, the policy can be related to privacy level, low-latency requirement, workload burstiness, etc. that gets translated into specific computation on the user end-user device 202, the firewall with connector 502, and the Cloud POP. Service chaining of various SSE functions may be implemented on all three control points. Functions that would benefit from scaling may be effectively offloaded to the Cloud.

Figure 11:
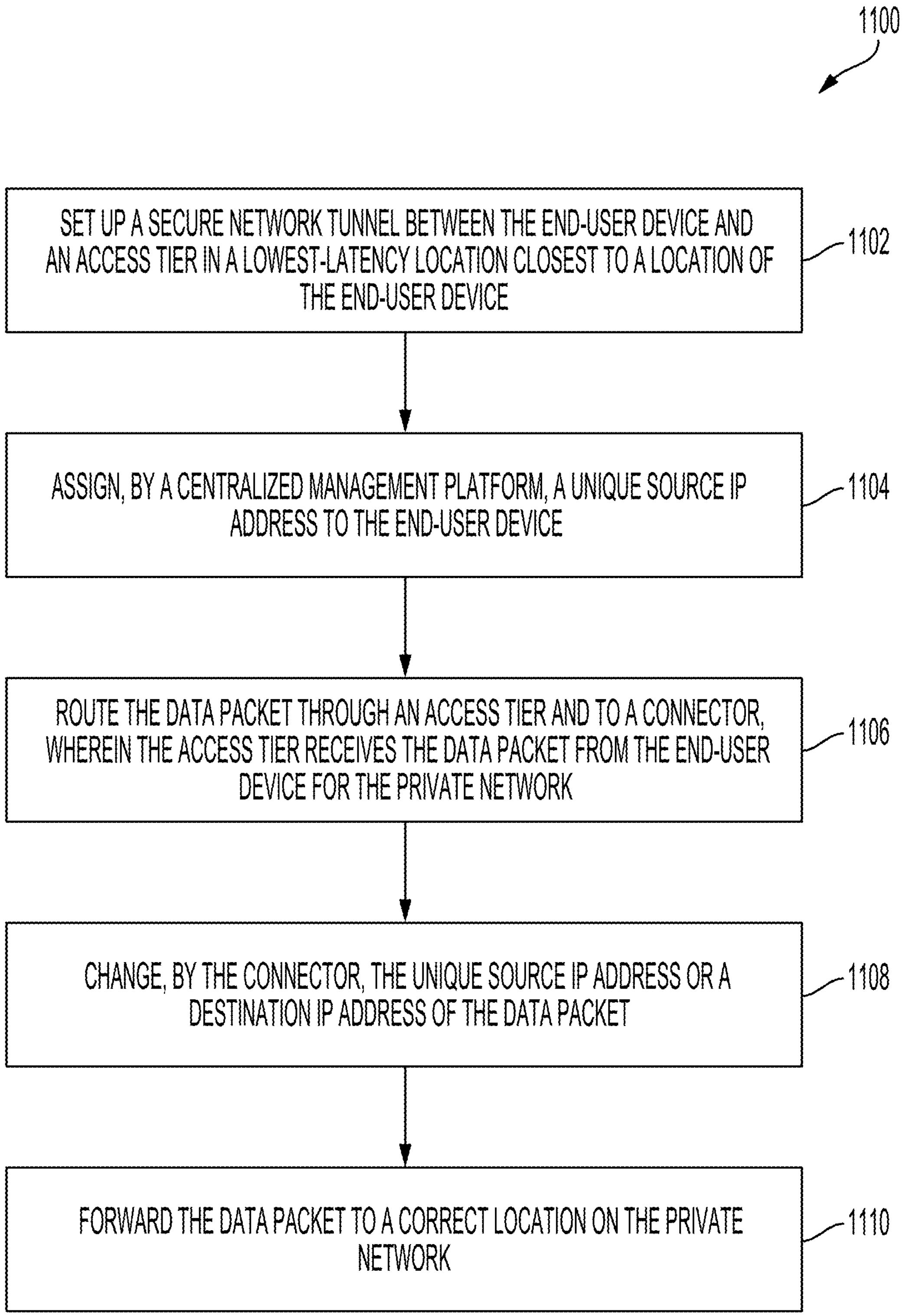
FIG. 11 illustrates a method for connecting an end-user device to a private network using a connector.

FIG. 11 illustrates an example method 1100 for connecting an end-user device to a private network using a firewall connector. Although example method 1100 depicts a particular sequence of operations, the sequence may be altered without departing from the scope of the present disclosure. For example, some of the operations depicted may be performed in parallel or in a different sequence that does not materially affect the function of method 1100. In other examples, different components of an example device or system that implements the method 1100 may perform functions at substantially the same time or in a specific sequence.

The firewall connector 206 may be a component that connects an end-user device 202 to a private network. Since the firewall connector 206 is located on the private network, it can establish secure connections between devices on the private network and authorized users working remotely. This allows users to access private resources securely, as if they were physically connected to the network. The firewall connector 206 may be responsible for authenticating remote users, establishing secure connections, allowing or blocking traffic based on security policies, and providing visibility into cloud-based and private network traffic.

According to some examples, the method includes setting up a secure network tunnel between the end-user device and an access tier in a lowest-latency location closest to a location of the end-user device at block 1102. In some cases, the firewall connector 206 may set up the secure network tunnel.

According to some examples, the method includes assigning a unique source IP address to the end-user device at block 1104. In some cases, the centralized management platform 412 may assign the unique source IP address.

According to some examples, the method includes receiving the data packet from an access tier at the firewall connector at block 1106. In some cases, the access tier may receive the data packet from the end-user device for the private network. In some cases, the firewall connector 206 may receive the data packet.

According to some examples, the method includes changing the unique source IP address or a destination IP address of the data packet at block 1108. In some cases, the firewall connector 206 may change the unique source IP address or the destination IP address. In some cases, the changing the unique destination IP address is performed by destination network address translation (DNAT) such that no two firewall connectors that are destinations have overlapping network address spaces in a virtual IP address space even if some of the firewall connectors do have overlapping addresses. In some case, changing the unique source IP address is performed by source network address translation (SNAT) such that the unique source IP address is changed to an IP address of the firewall connector on the private network.

In some cases, the source network address translation (SNAT) may be logically disabled at the access tier and at the firewall connector. In some cases, the SNAT may be logically disabled by applying SNAT to a source IP address of the device to a unique range of IP addresses for each access tier and translating back to the source IP address at the firewall connector. In some cases, the translating is performed using static network address translation (NAT) rules that is a reverse translation of a destination IP address translation used at the access tier.

According to some examples, the method includes forwarding the data packet to a correct location on the private network at block 1110. In some cases, the firewall connector 206 may forward the data packet.

In some cases, the method includes periodically fetching, by the firewall connector, a configuration from the centralized management platform. In some cases, the method includes configuring, by the firewall connector, Linux networking according to the configuration. In some cases, the firewall connector periodically, reports a firewall connector status to the centralized management platform and proxies remote end-user DNS queries to a local name server. In some cases, an executable is used to proxy DNS requests from the end-user device. The executable may allow for features including transparent retries and cycling through different name sever IPs if one fails. In some cases, iptables are used to create a DNAT rule to give the firewall connector an ability to forward DNS queries directly to an IP address of a local name server.

Figure 12:
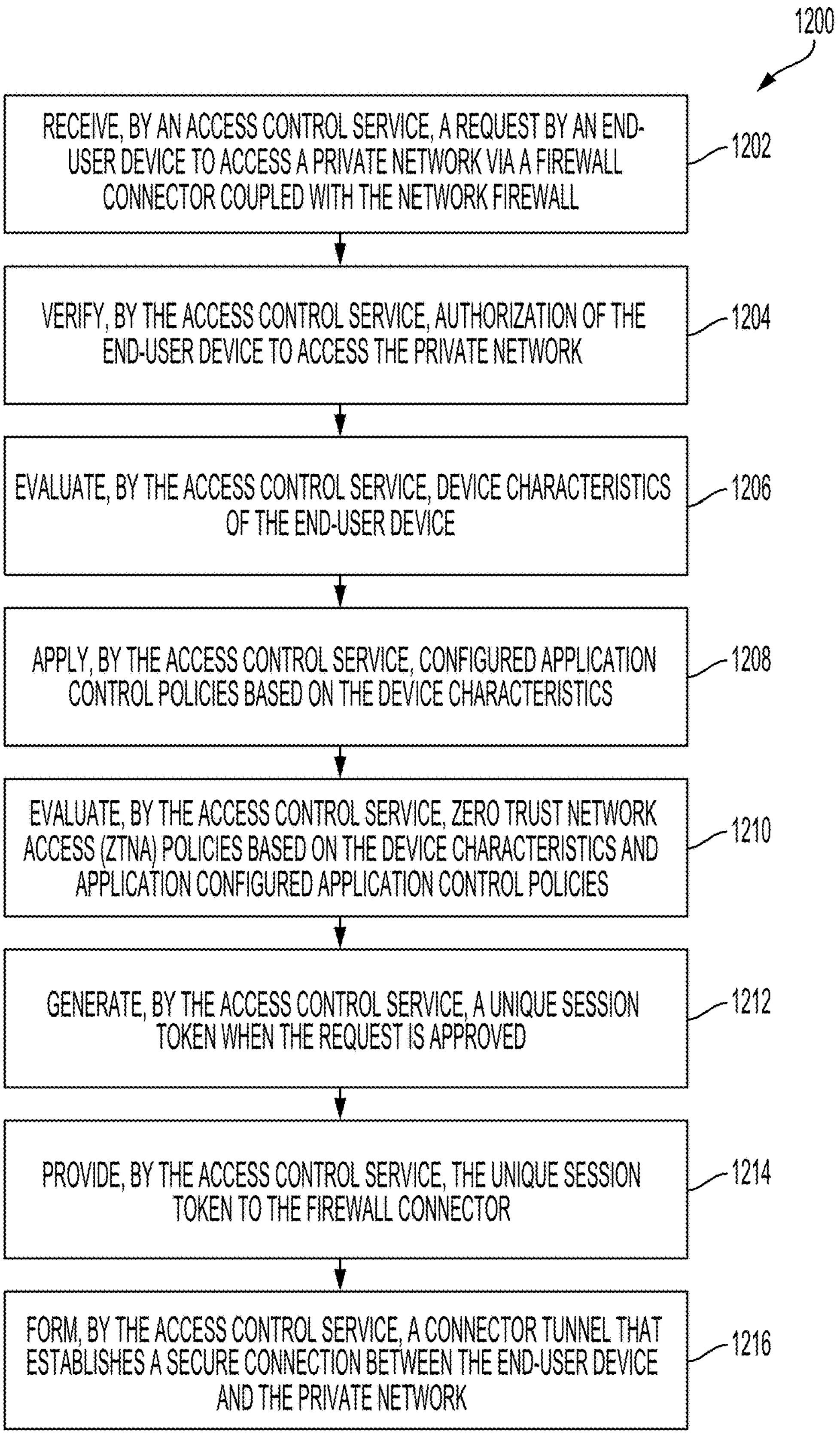
FIG. 12 illustrates a method for triggering provisioning of cloud-based security through a network firewall in accordance with one embodiment.

FIG. 12 illustrates an example method 1200 for triggering provisioning of cloud-based security through a network firewall. Although the example method 1200 depicts a particular sequence of operations, the sequence may be altered without departing from the scope of the present disclosure. For example, some of the operations depicted may be performed in parallel or in a different sequence that does not materially affect the function of the method 1200. In other examples, different components of an example device or system that implements the method 1200 may perform functions at substantially the same time or in a specific sequence.

The access control service 410 may be a cloud-based service of a centralized management platform 412. The centralized management platform 412 may manage the access control service 410 to provide administrators to manage and monitor end-user devices from a single interface, configure firewall policies, and view real-time reporting and analytics on network activity. In some cases, the 410 may trigger provision ing of cloud-based security through a network firewall.

According to some examples, the method includes receiving a request by an end-user device to access a private network via a firewall connector coupled with the network firewall at block 1202. In some cases, the access control service 410 may receive the request.

According to some examples, the method includes verifying authorization of the end-user device to access the private network at block 1204. In some cases, the access control service 410 may verify the authorization. According to some examples, the method includes evaluating device characteristics of the end-user device at block 1206. In some cases, the access control service 410 may evaluate the device characteristics.

According to some examples, the method includes applying configured application control policies based on the device characteristics at block 1208. In some cases, the access control service 410 may apply the configured application control polices. According to some examples, the method includes evaluating zero trust network access (ZTNA) policies based on the device characteristics and application configured application control policies at block 1210. In some cases, the access control service 410 may evaluate ZTNA policies.

According to some examples, the method includes generating a unique session token when the request is approved at block 1212. In some cases, the access control service 410 may generate the unique session token. According to some examples, the method includes providing the unique session token to the firewall connector at block 1214. In some cases, the access control service 410 may provide the unique session token.

According to some examples, the method includes forming a connector tunnel that establishes a secure connection between the end-user device and the private network at block 1216. In some cases, the access control service 410 may form the connector tunnel. In some case, the connector tunnel uses WireGuard peering.

In some cases, periodic requests to get updates on connector configuration may be received from the firewall connector and updates about connector tunnel performance and availability may be sent to the firewall connector.

In some cases, a child tenant associated with the end-user device may be provisioned for a managed service provider. Customer access rights may be assigned to the child tenant and product licenses may be managed for the child tenant. In some cases, the managed service provider and the child tenant may be requested to be register through a browser via the access control service. The managed service provider may be requested to be provisioned with the centralized management platform. After the managed service provider is successfully provisioned, the child tenant may be provisioned with the centralized management platform. Administrators may be created for the managed service provider and one or more of the administrators may be assigned to the child tenant. In some cases, the provisioning status may be sent to the browser to be displayed.

After the end-user device is successfully provisioned with the centralized management platform, in some cases, the firewall connector may be activated, and a request from the firewall connector to initiate connector provisioning may be received by a license manager.

A license may be requested by the firewall connector through the license manager. The license manager may be sent a list of local network routes and private DNS domains and JSON specifications for the firewall connector may be provisioned in the centralized management platform.

In some cases, the license manager may call the access control service. The access control service may request the centralized management platform to issue an org admin-scoped API key to the license manager. The centralized management platform may provide the org admin-scoped API key to the to the access control service, and the access control service may provide the org admin-scoped API key to the license manager. The license manager may use the org admin-scoped API key to provision a connector-scoped API key in the centralized management platform.

In the centralized management platform, the connector-scoped API key may be created based on connector specifications that ties the firewall connector to the connector-scoped API key. The connector-scoped API key may then be provided to the license manager.

In some cases, the license manager may send the connector-scoped API key to the firewall connector. The firewall connector may call the centralized management platform by using the connector-scoped API key to fetch connector configurations and reporting connector tunnel status.

In some cases, the firewall connector may fetch a tunnel config of the connector tunnel with the connector-scoped API key from the centralized management platform. The access control service may receive the tunnel config, apply any config changes to the connector tunnel, and publish tunnel health status to centralized management platform.

Figure 13:
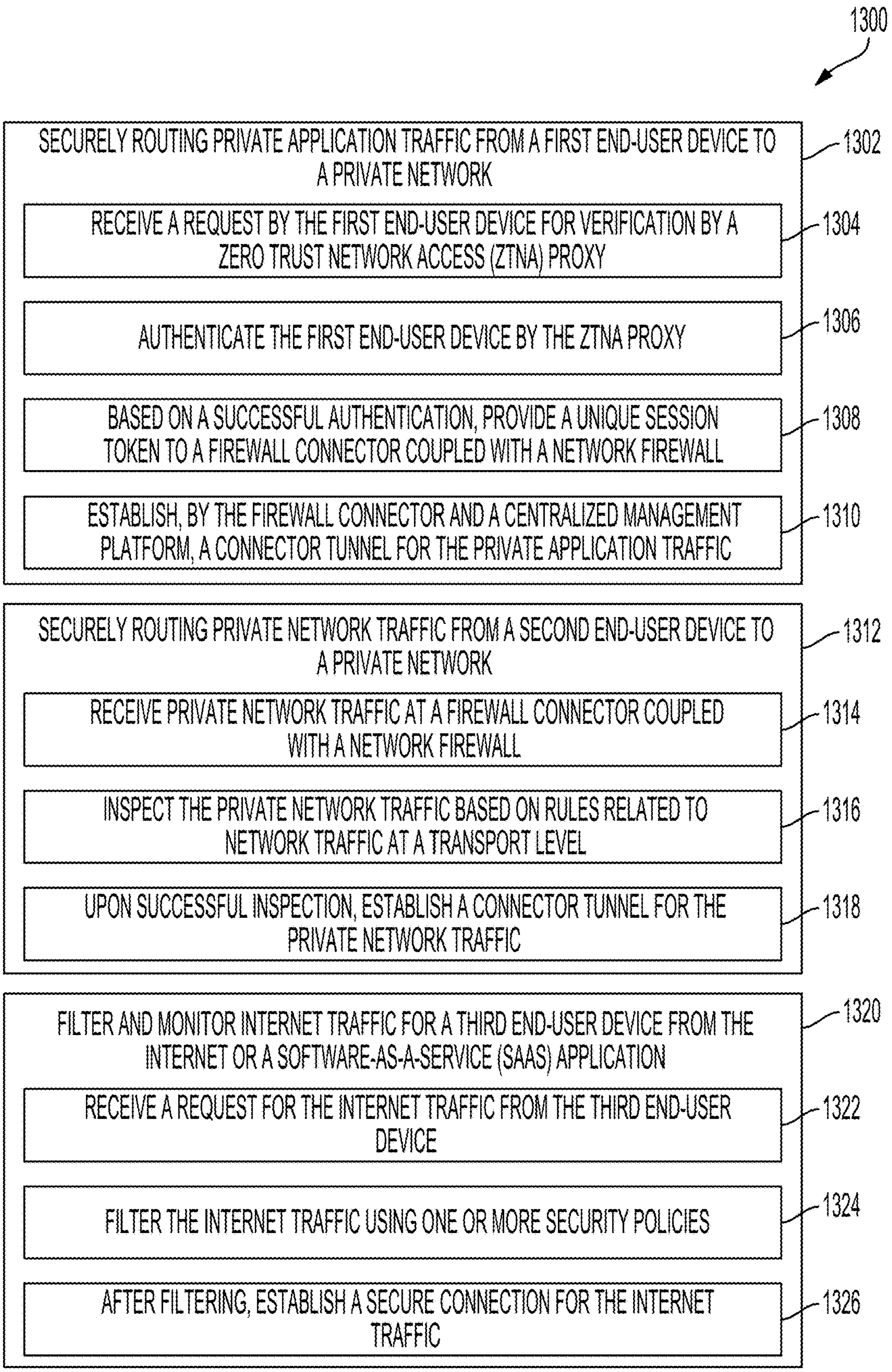
FIG. 13 illustrates an example method for securely routing and controlling access of various types of traffic for one or more end-user devices.

FIG. 13 illustrates an example method 1300 for securely routing and controlling access of various types of traffic for one or more end-user devices. Although the example method 1300 depicts a particular sequence of operations, the sequence may be altered without departing from the scope of the present disclosure. For example, some of the operations depicted may be performed in parallel or in a different sequence that does not materially affect the function of the method 1300. In other examples, different components of an example device or system that implements the method 1300 may perform functions at substantially the same time or in a specific sequence.

According to some examples, the method includes securely routing private application traffic from a first end-user device to a private network at block 1302. In some cases, the securely routing private application traffic may comprise receiving a request by the first end-user device for verification by a zero trust network access (ZTNA) proxy at block 1304. In some cases, the securely routing private application traffic may comprise authenticating the first end-user device by the ZTNA proxy at block 1306. In some cases, the securely routing private application traffic may comprise providing a unique session token to a firewall connector coupled with a network firewall basing on a successful authentication at block 1508.

According to some examples, the method includes establishing, by the firewall connector and a centralized management platform, a connector tunnel for the private application traffic at block 1310. In some cases, the establishing the connector tunnel may comprise securely routing private network traffic from a second end-user device to a private network, comprising at block 1312. In some cases, the establishing the connector tunnel may comprise receiving private network traffic at a firewall connector coupled with a network firewall at block 1314. In some cases, the establishing the connector tunnel may comprise inspecting the private network traffic based on rules related to network traffic at a transport level at block 1316. In some cases, the establishing the connector tunnel may comprise establishing a connector tunnel for the private network traffic upon successful inspection, at block 1318.

According to some examples, the method includes filtering and monitor Internet traffic for a third end-user device from the internet or a software-as-a-service (SaaS) application, comprising at block 1320. In some cases, the filtering and monitoring Internet traffic may include receiving a request for the Internet traffic from the third end-user device at block 1322. In some cases, the filtering and monitoring Internet traffic may include filtering the Internet traffic using one or more security policies at block 1324. In some cases, the filtering and monitoring Internet traffic may include establishing a secure connection for the Internet traffic after filtering at block 1326.

Figure 14:
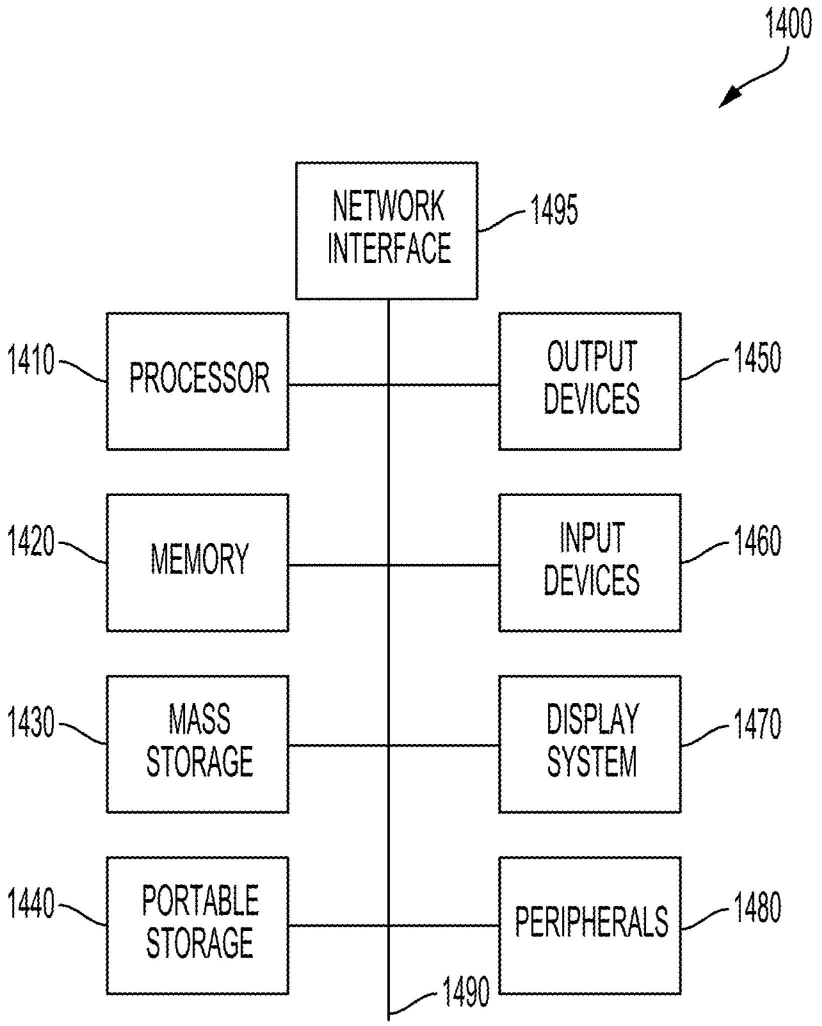
FIG. 14 illustrates a computing system that may be used to implement an embodiment of the present disclosure.

FIG. 14 illustrates a computing system that may be used to implement an embodiment of the present disclosure. The computer system 1400 of FIG. 14 includes one or more processors 1410 and main memory 1420. Main memory 1420 stores, in part, instructions and data for execution by processor 610. Main memory 1420 can store the executable code when in operation. The computer system 1400 of FIG. 14 further includes a mass storage device 1430, portable storage medium drive(s) 640, output devices 1450, user input devices 1460, a graphics display system 1470, peripheral devices 1480, and network interface 1495.

The components shown in FIG. 14 are depicted as being connected via a single bus 1490. However, the components may be connected through one or more data transport means. For example, processors 1410 and main memory 1420 may be connected via a local microprocessor bus, and the mass storage device 1430, peripheral device(s) 680, portable storage device 1440, and display system 1470 may be connected via one or more input/output (I/O) buses.

Mass storage device 1430, which may be implemented with a magnetic disk drive or an optical disk drive, is a non-volatile storage device for storing data and instructions for use by processors 1410. Mass storage device 1430 can store the system software for implementing embodiments of the present disclosure for purposes of loading that software into main memory 1420.

Portable storage device 1440 operates in conjunction with a portable non-volatile storage medium, such as a FLASH memory, compact disk or Digital video disc, to input and output data and code to and from the computer system 1400 of FIG. 14. The system software for implementing embodiments of the present disclosure may be stored on such a portable medium and input to the computer system 1400 via the portable storage device 1440.

Input devices 1460 provide a portion of a user interface. Input devices 1460 may include an alpha-numeric keypad, such as a keyboard, for inputting alpha-numeric and other information, or a pointing device, such as a mouse, a trackball, stylus, or cursor direction keys. Additionally, the computer system 1400 as shown in FIG. 14 includes output devices 1450. Examples of suitable output devices include speakers, printers, network interfaces, and monitors.

Display system 1470 may include a liquid crystal display (LCD), a plasma display, an organic light-emitting diode (OLED) display, an electronic ink display, a projector-based display, a holographic display, or another suitable display device. Display system 1470 receives textual and graphical information, and processes the information for output to the display device. The display system 1470 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripheral devices 1480 may include any type of computer support device to add additional functionality to the computer system. For example, peripheral device(s) 680 may include a modem or a router.

Network interface 1495 may include any form of computer interface of a computer, whether that be a wired network or a wireless interface. As such, network interface 1495 may be an Ethernet network interface, a BlueTooth™ wireless interface, an 802.11 interface, or a cellular phone interface.

The components contained in the computer system 1400 of FIG. 14 are those typically found in computer systems that may be suitable for use with embodiments of the present disclosure and are intended to represent a broad category of such computer components that are well known in the art. Thus, the computer system 1400 of FIG. 14 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 1400 may in some cases be a virtual computer system executed by another computer system. Various operating systems can be used including Unix, Linux, Windows, Macintosh OS, Palm OS, Android, IOS, and other suitable operating systems.

The present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

The present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the disclosure, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for securely routing and controlling access of various types of traffic for one or more end-user devices, the method comprising:

securely routing private application traffic from a first end-user device to a private network, comprising:

receiving a first request by the first end-user device for verification by a Zero Trust Network Access (ZTNA) proxy;

authenticating the first end-user device by the ZTNA proxy;

based on a successful authentication, providing a unique session token to a firewall connector coupled with a network firewall;

receiving, by a license manager, a request from the firewall connector to initiate connector provisioning; and establishing, by the firewall connector and a centralized management platform, a first connector tunnel for the private application traffic;

securely routing private network traffic from a second end-user device to the private network, comprising:

receiving the private network traffic at the firewall connector coupled with the network firewall;

inspecting the private network traffic based on rules related to network traffic; and establishing a second connector tunnel for the private network traffic.

2. The method of claim 1, wherein an access control service is a cloud-based service of the centralized management platform wherein the method further comprising:

managing, by the centralized management platform, the access control service to provide administrators to manage and monitor end-user devices from a single interface, configure firewall policies, and view real-time reporting and analytics on network activity.

3. The method of claim 2, further comprising:

verifying, by the access control service, authorization of the first end-user device to access the private network;

evaluating, by the access control service, device characteristics of the first end-user device;

applying, by the access control service, configured application control policies based on the device characteristics; and evaluating, by the access control service, Zero Trust Network Access (ZTNA) policies based on the device characteristics and application configured application control policies.

4. The method of claim 3, further comprising:

generating, by the access control service, the unique session token when the request is approved;

providing, by the access control service, the unique session token to the firewall connector; and forming, by the access control service, a connector tunnel that establishes a secure connection between the first end-user device and the private network.

5. The method of claim 1, further comprising:

assigning, by the centralized management platform, a unique source IP address to the second end-user device;

receiving a data packet from an access tier at the firewall connector, wherein the access tier receives the data packet from the second end-user device for the private network;

changing, by the firewall connector, the unique source IP address or a destination IP address of the data packet;

forwarding, by the firewall connector, the data packet to a correct location on the private network;

receiving, from the firewall connector, periodic requests to get updates on connector configuration; and sending, to the firewall connector, updates about connector tunnel performance and availability.

6. The method of claim 1, wherein the second connector tunnel uses WireGuard peering.

7. The method of claim 2, further comprising:

provisioning a child tenant associated with the first end-user device for a managed service provider;

assigning customer access rights to the child tenant; and managing product licenses for the child tenant.

8. The method of claim 7, further comprising:

requesting to register, through a browser, the managed service provider and the child tenant through the access control service;

requesting to provision the managed service provider with the centralized management platform;

after the managed service provider is successfully provisioned, provisioning the child tenant with the centralized management platform;

creating administrators for the managed service provider;

assigning one or more of the administrators to the child tenant; and sending provisioning status to the browser.

9. The method of claim 2, further comprising:

requesting, by the firewall connector, a license through the license manager;

sending to the license manager a list of local network routes and private DNS domains; and provision JavaScript Object Notation (JSON) specifications in the centralized management platform for the firewall connector.

10. The method of claim 9, further comprising:

calling, by the license manager, the access control service;

requesting, by the access control service, the centralized management platform to issue an org admin-scoped Application Programming Interface (API) key to the license manager;

providing, by the centralized management platform, an org admin-scoped API key to the access control service;

providing, by the access control service, the org admin-scoped API key to the license manager;

using, by the license manager, the org admin-scoped API key to provision a connector-scoped API key in the centralized management platform;

creating, in the centralized management platform, the connector-scoped API key based on connector specifications that ties the firewall connector to the connector-scoped API key; and providing the connector-scoped API key to the license manager.

11. The method of claim 10, further comprising:

sending, by the license manager, the connector-scoped API key to the firewall connector; and calling, by the firewall connector, the centralized management platform by using the connector-scoped API key to fetch connector configurations and reporting connector tunnel status.

12. The method of claim 11, further comprising:

fetching, by the firewall connector, a tunnel config of the first connector tunnel with the connector-scoped API key from the centralized management platform;

receiving, by the access control service, the tunnel config;

applying, by the access control service, any config changes to the first connector tunnel; and publish, by the access control service, tunnel health status to the centralized management platform.

13. The method of claim 1, wherein inspecting the private network traffic is based on rules related to network traffic at a transport level, and wherein the second connector tunnel is established upon successful inspection of the private network traffic.

14. The method of claim 1, further comprising:

filtering and monitoring Internet traffic for a third end-user device from the Internet or a Software-as-a-Service (Saas) application, comprising:

receiving a second request for the Internet traffic from the third end-user device;

filtering the Internet traffic using one or more security policies; and after filtering, establishing a secure connection for the Internet traffic.

15. A system for securely routing and controlling access of various types of traffic for one or more end-user devices, the system comprising:

a centralized management platform; and a firewall connector coupled with a network firewall, the firewall connector configured to:

securely route private application traffic from a first end-user device to a private network, comprising:

receiving a request by the first end-user device for verification by a Zero Trust Network Access (ZTNA) proxy;

authenticating the first end-user device by the ZTNA proxy;

based on a successful authentication, providing a unique session token to the firewall connector coupled with a network firewall; and establishing, with the centralized management platform, a first connector tunnel for the private application traffic; and securely route private network traffic from a second end-user device to the private network, comprising:

receiving the private network traffic at the firewall connector;

inspecting the private network traffic based on rules related to network traffic; and establishing a second connector tunnel between the second end-user device and an access tier in a lowest-latency location closest to a location of the second end-user device for the private network traffic.

16. The system for securely routing of claim 15, wherein the firewall connector is further configured to:

receive a data packet from an access tier, wherein the access tier receives the data packet from the second end-user device for the private network;

change a unique source IP address or a destination IP address of the data packet; and forward the data packet to a correct location on the private network.

17. The system of claim 15, wherein the centralized management platform is configured to assign a unique source IP address to a respective end-user device.

18. The system of claim 15, wherein inspecting the private network traffic is based on rules related to network traffic at a transport level, and wherein the second connector tunnel is established upon successful inspection of the private network traffic.

19. The system of claim 15, wherein the firewall connector is further configured to:

filter and monitor Internet traffic for a third end-user device from the Internet or a Software-as-a-Service (SaaS) application, comprising:

receiving a request for the Internet traffic from the third end-user device; and after the Internet traffic is filtered using one or more security policies, establishing a secure connection for the Internet traffic.

20. A non-transitory computer readable storage medium having embodied thereon a program executable by a processor for implementing a method for securely routing and controlling access of various types of traffic for one or more end-user devices, the method comprising:

securely routing private application traffic from a first end-user device to a private network, comprising:

receiving a request by the first end-user device for verification by a Zero Trust Network Access (ZTNA) proxy;

authenticating the first end-user device by the ZTNA proxy;

based on a successful authentication, providing a unique session token to a firewall connector coupled with a network firewall; and receiving, by a license manager, a request from the firewall connector to initiate connector provisioning;

establishing, by the firewall connector and a centralized management platform, a first connector tunnel for the private application traffic;

securely routing private network traffic from a second end-user device to the private network, comprising:

receiving the private network traffic at the firewall connector coupled with the network firewall;

inspecting the private network traffic based on rules related to network traffic; and establishing a second connector tunnel for the private network traffic.

* * * * *